Feb. 3, 1931.  J. F. BURCH ET AL  1,791,346
FISHING CREEL
Filed Oct. 14, 1929   2 Sheets-Sheet 1

Inventors
A. H. Morton
AND J. F. Burch

By Wilkinson & Giusta
Attorneys

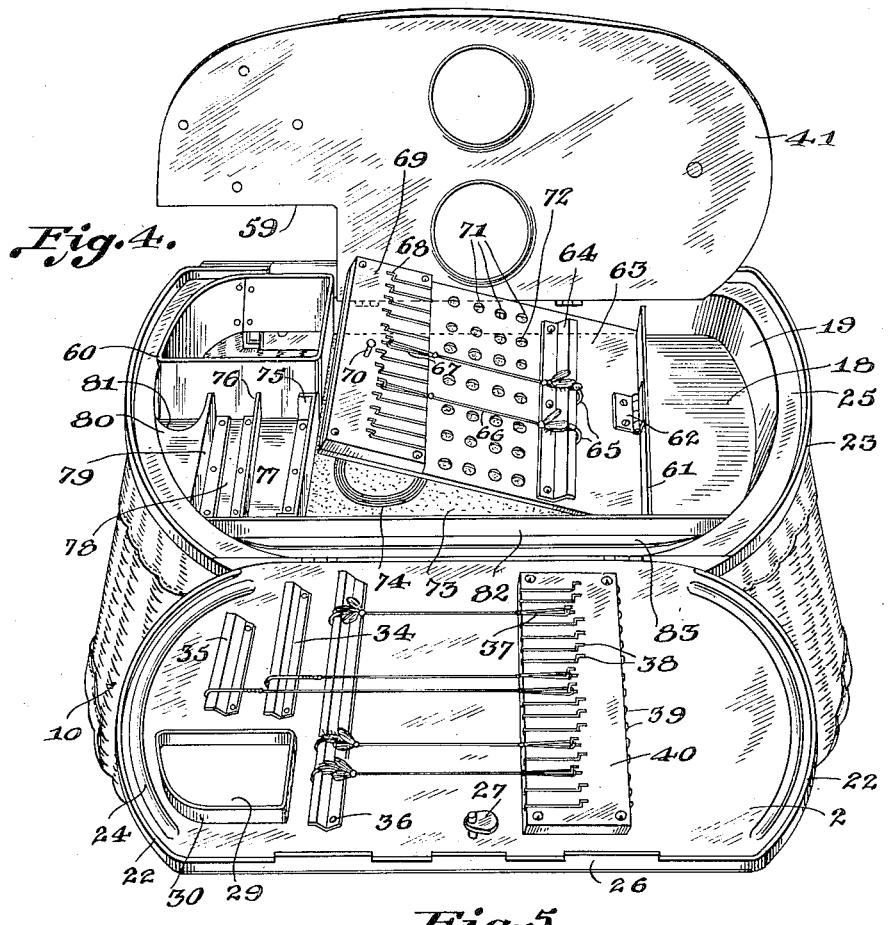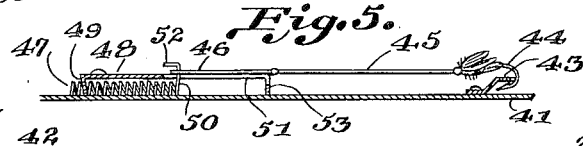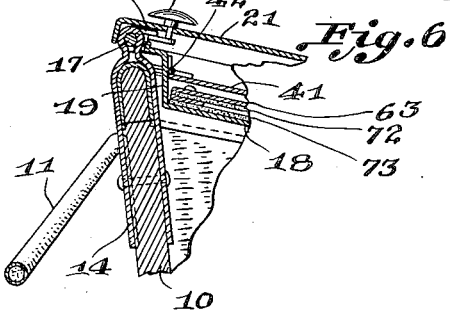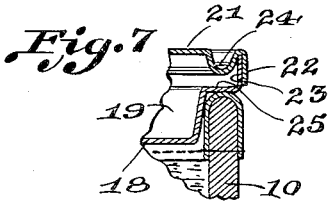

Patented Feb. 3, 1931

1,791,346

UNITED STATES PATENT OFFICE

JOHN F. BURCH AND ARNOLD H. MORTON, OF BILLINGS, MONTANA

FISHING CREEL

Application filed October 14, 1929. Serial No. 399,662.

The present invention relates to improvements in fishing creels, and has for an object to provide an improved combination basket for containing fish and for holding fishing tackle which will be of a light and readily portable character without being onerous, and which will be compact in the arrangement of compartments for containing the fishing paraphernalia.
Another object of the invention is to produce a unitary cover construction for fishing baskets or creels in which the unit may be attached to any of the conventional forms of baskets without involving any alteration therein, and whereby, with a minimum of expense, the advantages of the invention may be had without the necessity for the purchase of an entire new basket.

A further object of the invention is to provide for improved convenience in the introduction of fish to the basket and in securing access to the various tackle compartments.

With the foregoing and other objects in view, the invention will be more fully described hereinafter, and will be more particularly pointed out in the claims appended hereto.

Figure 1:
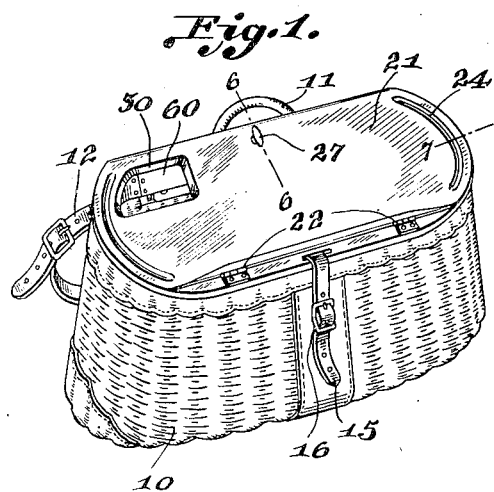
Figure 2:
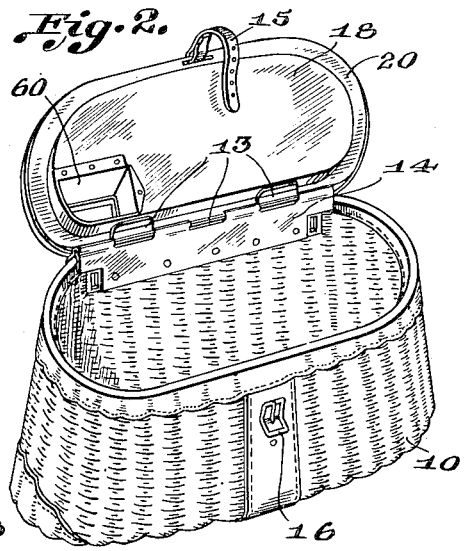

In the drawings, wherein like symbols refer to like or corresponding parts throughout the several views, Figure 1 is a perspective view of an improved fishing creel constructed according to the present invention and shown in the closed position.
Figure 2 is a similar view with the cover thrown open.

Figure 3:
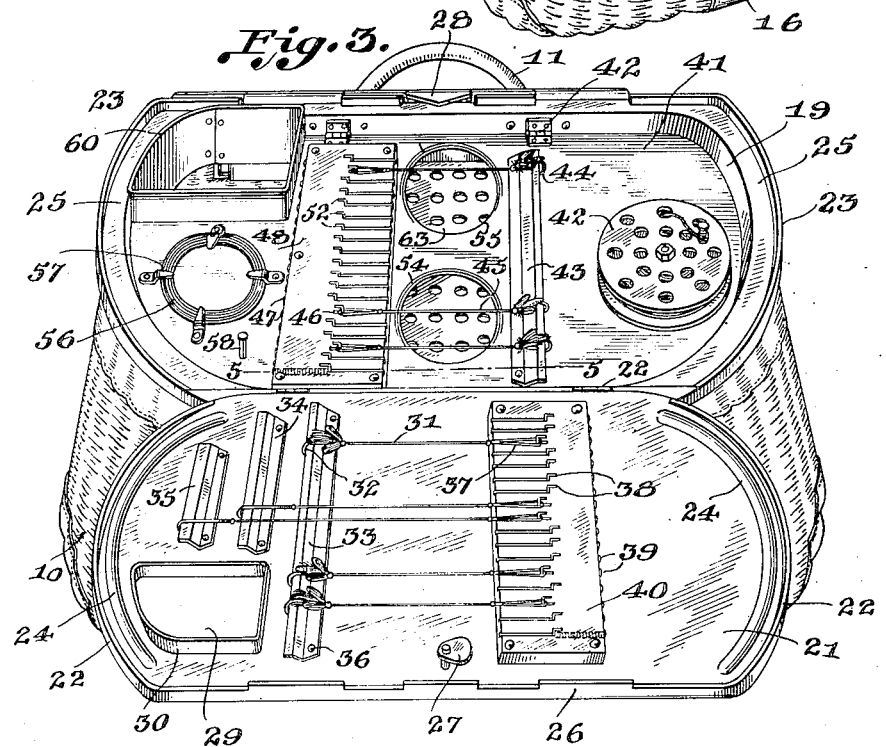

Figure 3 is also a perspective view showing the cover closed but one of the compartment lids in the open position.
Figure 4 is a further perspective view showing the cover closed but with all the compartment lids in the open position.

Figure 5 is a fragmentary sectional view taken on the line 5—5 in Figure 3.
Figure 6 is a similar view taken on the line 6—6 in Figure 1, and Figure 7 is also a fragmentary section taken on the line 7—7 in Figure 1.

Referring more particularly to the drawings 10 designates generally a fishing basket or creel of a conventional construction having a handle 11 by which the same may be carried or a strap 12 for slinging over the shoulder. A cover is provided for the creel shown in Figure 2 in the open position and being secured to the creel as by the hinges 13 secured to the inverted U-shaped reinforcing strip 14 secured along the rear edge of the basket as appears from Figures 2 and 4.

The free edge of the cover is provided with a strap 15 for cooperating with a buckle 16 upon the basket to retain the cover in the closed position as shown in Figure 1.

Now the cover is preferably a unitary construction which may be applied to any existing form of basket body 10 by simply hinging the same to the basket body; if the basket body lacks any hinge joint connection, the U-shaped metal strip 14 may be applied to such basket body and through this strip is inserted the hinge pintle 17 as appears in Figure 6, the pintle passing through the hinge leaves both of the cover and of the strip 14.

The cover is formed of a base 18 constructed with a flange 19, whereby such base extends into the basket and the flange 19 enters the mouth of the basket and tends to center the cover there within. A shoulder 20 extends outwardly of the flange 19 and is adapted to rest upon the upper, generally reinforced, edge of the basket 10. A top lid 21 is hinged as indicated at 22 to the outer edge of the cover base. This top lid is best shown in Figure 3 and it is provided with side flanges 22 which are adapted to fit over the upstanding side flanges 23 of the cover base.

The top lid 21 is also provided with inwardly pressed beads 24 spaced from the flanges 22 so that the beads 24 extend inwardly of the upstanding cover flanges 23 and they may rest upon the seats 25 provided inwardly of the upstanding flanges 23 upon the cover base. A flange 26 is provided along the free rear edge of the top lid 21 for the purpose of snapping over the upper edge portion of the strip 14 and the hinge joint 13. A rotary or other catch 27 is part of the equipment of the top lid 21, such catch being adapted to snap beneath a lug 28 upon the strip 14 or upon the cover base.

The top lid 21 is provided with an opening 29 having an inturned flange 30 thereabout, the fish being introduced into the basket through this opening 29. Leaders 31 are shown as having plain or fly hooks 32 thereon. These hooks are engaged over bars 33, 34 and 35. These bars may be provided in any number and may be of any desired length. Such bars are secured as by fastenings 36, rivets being preferred, to the inside of the top lid 21. The free longitudinal edges of the bars are spaced away from the lid to receive the hooks 32. The loops 37 of the leaders 31 are engaged over the upper projecting ends 38 of coil springs 39 secured upon the inside of the lid 21 as by a clamp plate 40.

An intermediate lid 41 is provided within the cover compartment, such intermediate lid being hinged as indicated at 42 to the cover base within the downturned depending flange 19 of the cover base and spaced below the seats 25 whereby a compartment exists between the top lid 21 and the intermediate lid 41 for accommodating the tackle carried upon the under side of the upper lid 21 and the upper side of the intermediate lid 41. A reel 42 is shown in Figure 3 as secured upon the upper side of the intermediate lid 41 at one end of the device. This reel is for winding extra line.

A transverse bar 43 adjoins this reel for receiving the hooks 44 attached to the leaders 45, the loops 46 of which are engaged with the upper ends of the springs 47.

If we refer to Figure 5, it will be seen that the springs 47 are held in place by a clamp bar 48 having a flange 49 at one end thereof which is adapted to be engaged through selected convolutions of the springs 47 to anchor the end portions of the springs remote from the upstanding arms 50. These arms 50 are in effect opposite end portions of the springs 47 and they extend up through slots 51 in the clamp bar 48 and are adapted to have sliding movement in such slots 51.

The upper ends of the arms 50 are turned backwardly to provide hooks or bills 52 to retain the engagement between the leader loops 46 and the springs. The clamp bars 48 are also provided with flanges 53 at the ends opposite the flanges 49 for extending down and engaging the intermediate lid 41 whereby to provide appropriate housings within the clamp bars 48 for receiving, and permitting the movement of, the springs 47. It will be understood that the tendency of the springs 47 to retract will hold the leaders 45 taut and the hooks 44 in firm engagement with the bars 43. This arrangement will prevent entanglement of the hooks and leaders and will preserve the tackle in a neat and compact arrangement within the device. When it is desired to remove a given hook, the leader is grasped and the spring 49 distended thus releasing the hook 44 from the bar 43, after which the tension may be relaxed and the loop 46 disengaged from the hook or bill 52 of the spring.

Returning to Figure 3, round or other openings 54 and 55 are made in an intermediate portion of the intermediate lid 41 for the purpose of permitting of the breathing of the compartment below and to lighten the structure.

A space is provided adjoining the clamp bar 48 and to one end of the device for receiving extra leaders shown at 56, there being appropriate clamps 57 carried by the intermediate lid 41 for holding such additional leaders in place.

The upper side of the intermediate lid 41 also preferably carries a peg or handle 58 by which the lid may be lifted.

Referring to Figure 4, the under side of the intermediate lid 41 is preferably devoid of any equipment in order to avoid interference with the equipment carried by the base 18 of the cover. The lid 41 is shown in Figure 4 as having a cut-out portion 59 for the purpose of extending about the collar 60 bent up from the base 18 and extending about an opening in the base through which the fish are let into the basket.

In the base 18 there is a compartment at the right side shown in Figure 4 for receiving artificial mice or other lure. This compartment is formed in part by the flange 19 of the base and in part by a transversely extending partition 61 which also acts as an abutment to which to secure a hinge 62 carrying the lower lid 63. This lower lid preferably does not extend the full length of the basket but only between the partition 61 and the adjacent wall of the collar 60.

This lower lid 61 preferably carries on its upper side a bar 64 for receiving the hooks 65 carried on the leaders 66, the loops 67 of which are engaged upon the upstanding arms or ends 68 of coil springs carried within a clamp plate 69 affixed to the upper side of the lower lid 63. A peg or handle 70 on the lid 63 provides for grasping and raising the same as indicated in Figure 4. The lid 63 is also preferably perforated as indicated at 71 to permit of the breathing of the interior compartment below the lid 63 which contains felt pads or other moisture absorbing material 72 and 73. Leaders 74 are adapted to be placed between the pads and maintained in a moist condition.

A partition 75 extends in alinement with the inner end of the collar 60 to form a continuous transverse abutment for the free end of the lower lid 63 and to constitute with an adjacent partition 76 a compartment 77 having hooks, spinners or other small articles. A compartment 78 adjacent the compartment 77 is useful for a like purpose. This compartment 78 is confined between the partition 76 and a partition 79 having a roof 80 with a cut-away mouth portion 81 to give access to the confined space beneath the roof portion, which confined space is useful for holding lead sinkers.

The roof portion 80, of course, extends over to the flange 19 of the cover base. A longitudinal partition 82 extends lengthwise in the base and segregates a narrow compartment 83 for receiving pliers or other tools.

It will be noted that the opening surrounded by the collar 60 through which the fish are received into the basket is placed in a corner of the device next to the user or fisherman whereby to make room for leader compartments and small compartments in the bottom.

It will be apparent from Figure 4 that the lids 21 and 42 open in opposite directions and they quickly and freely give access to all interior compartments for the insertion and removal of tackle and they thus leave free the lower lid 63 to be raised as indicated in this Figure 4.

The entire arrangement of lids is carried by the basket cover as a unit and it may be detached from the basket when worn out and applied to a new basket body.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved fishing creel comprising a basket, a base cover for the basket having a flanged portion for entering the basket and a seat about the flange, a top lid hinged to the base and adapted to rest upon said seat, an intermediate lid hinged to the base and adapted to rest within the flange of the base, and a third lid hinged to the base and forming a compartment therewith.

2. An improved fishing creel comprising a basket, a cover base hinged to the basket and having a flange entering the basket, a top lid hinged to the free edge of said cover base, an intermediate lid hinged to the flange of the cover base at the hinged side of said cover base, and a third lid hinged transversely to the cover base.

3. An improved fishing creel comprising a basket, a cover base hinged to the basket and having a downwardly extending flange, a seat outwardly of the flange and upstanding flanges at the outer part of the seat, an upper lid hinged to the base at the free edge thereof and having lateral flanges for fitting together with the upstanding flanges of the base, an intermediate lid hinged to a downwardly extending flange of the base along the hinged side of the base, a third lid hinged transversely of the bottom of the base, means for carrying fishing tackle mounted upon said lids, compartments in said base covered by the intermediate lid, and a collar extending about and opening through said base and lids.

4. In a fishing creel, a basket, a cover base hinged to the basket, oppositely folding lids carried by said base and having means to maintain the same spaced apart, and fishing tackle carried by said lids.

JOHN FREDERICK BURCH.
ARNOLD H. MORTON.